United States Patent
Matsukawa

(10) Patent No.: US 7,236,690 B2
(45) Date of Patent: Jun. 26, 2007

(54) EVENT MANAGEMENT SYSTEM

(75) Inventor: Takayuki Matsukawa, Urayasu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1105 days.

(21) Appl. No.: 10/227,197

(22) Filed: Aug. 26, 2002

(65) Prior Publication Data

US 2003/0044168 A1    Mar. 6, 2003

(30) Foreign Application Priority Data

Aug. 29, 2001   (JP) ............................. 2001-259281

(51) Int. Cl.
*H04N 5/225*    (2006.01)
(52) U.S. Cl. .................... 386/117; 386/46; 386/59; 386/107; 348/207.99; 348/143
(58) Field of Classification Search ............. 348/153, 348/143, 135, 207.99; 386/107, 117
See application file for complete search history.

(56) References Cited

U.S. PATENT DOCUMENTS

| | | | |
|---|---|---|---|
| 4,814,869 A | | 3/1989 | Oliver, Jr. |
| 4,943,854 A | | 7/1990 | Shiota et al. |
| 5,671,009 A | | 9/1997 | Chun |
| 5,875,304 A | * | 2/1999 | Winter et al. ............... 709/231 |
| 6,064,303 A | * | 5/2000 | Klein et al. ................ 340/506 |
| 6,987,528 B1 | * | 1/2006 | Nagahisa et al. .......... 348/143 |
| 2004/0062525 A1 | * | 4/2004 | Hasegawa et al. ............. 386/69 |
| 2004/0080625 A1 | * | 4/2004 | Kurosawa et al. ..... 348/211.99 |

FOREIGN PATENT DOCUMENTS

| | | |
|---|---|---|
| EP | 0967584 | 12/1999 |
| JP | 2000-339923 | 12/2000 |
| JP | 2000-0339923 | 12/2000 |
| WO | 98/19450 | 5/1998 |

OTHER PUBLICATIONS

English Language Abstract of JP 2000-339923.

* cited by examiner

*Primary Examiner*—Thai Q. Tran
*Assistant Examiner*—Helen Shibru
(74) *Attorney, Agent, or Firm*—Greenblum & Bernstein, P.L.C.

(57) ABSTRACT

Cameras that are related to an alarm and a time period of an image that each camera records are defined in advance, and at a time of alarm occurrence, management data is made with reference to the definition contents. A surveillance object's transfer path is presumed, and on the basis of this presumption, with each of cameras installed along the pathway, the time periods of the images that are to be associated with an event are each delayed and defined. By this, it is possible to record the suspicious behavior that the surveillance object demonstrates at the time of alarm occurrence and the suspicious behavior that the surveillance object demonstrates on its transfer path to a surveillance area as an event image. Furthermore, it is possible to narrow the time periods of images in which the surveillance object may be caught.

7 Claims, 23 Drawing Sheets

| EVENT TYPE | SENSOR ID | LOCAL EVENT 1 | | | LOCAL EVENT 2 | | | LOCAL EVENT 3 | | | LOCAL EVENT 4 | | |
|---|---|---|---|---|---|---|---|---|---|---|---|---|---|
| | | CAMERA ID | START TIME | END TIME | CAMERA ID | START TIME | END TIME | CAMERA ID | START TIME | END TIME | CAMERA ID | START TIME | END TIME |
| 1 | 1 | 1 | −1 | +5 | 3 | −3 | +8 | 4 | −5 | +10 | | | |
| 2 | 2 | 2 | −1 | +5 | 3 | −3 | +8 | 4 | −5 | +10 | | | |
| ... | ... | ... | ... | ... | ... | ... | ... | ... | ... | ... | ... | ... | ... |

FIG.4

| EVENT ID | EVENT TYPE | SENSOR ID | ALARM OCCURRENCE HOUR | EVENT START HOUR | EVENT END HOUR | CAMERA ID | LOCAL EVENT ID |
|---|---|---|---|---|---|---|---|
| 1 | 1 | 1 | 20010625 10:35:10 | 20010625 10:30:10 | 20010625 10:45:10 | 1 | 1 |
|  |  |  |  |  |  | 3 | 1 |
|  |  |  |  |  |  | 4 | 1 |
| ... | ... | ... | ... | ... | ... | ... | ... |

FIG.6

| LOCAL EVENT ID | START HOUR | END HOUR | START ADDRESS | END ADDRESS |
|---|---|---|---|---|
| 1 | 20010625 10:34:10 | 20010625 10:40:10 | 100 | 200 |
| ... | ... | ... | ... | ... |

FIG.8

| EVENT TYPE | SENSOR ID | LOCAL EVENT 1 CAMERA ID | LOCAL EVENT 1 START TIME | LOCAL EVENT 1 END TIME | LOCAL EVENT 2 CAMERA ID | LOCAL EVENT 2 START TIME | LOCAL EVENT 2 END TIME | LOCAL EVENT 3 CAMERA ID | LOCAL EVENT 3 START TIME | LOCAL EVENT 3 END TIME | LOCAL EVENT 4 CAMERA ID | LOCAL EVENT 4 START TIME | LOCAL EVENT 4 END TIME |
|---|---|---|---|---|---|---|---|---|---|---|---|---|---|
| 1 | 1 | 1 | O −1 | C +1 | 3 | O −3 | C +3 | 4 | O −5 | C +5 | | | |
| 2 | 2 | 2 | O −1 | C +1 | 3 | O −3 | C +3 | 4 | O −5 | C +5 | | | |
| ... | ... | ... | ... | ... | ... | ... | ... | ... | ... | ... | ... | ... | ... |

O: OCCURRENCE
C: CANCELLATION

FIG.11

| ALARM SIGNAL | SENSOR ID | OCCURRENCE/CANCELLATION |
|---|---|---|
| 10 | 1 | OCCURRENCE |
| 11 | 1 | CANCELLATION |
| 20 | 2 | OCCURRENCE |
| 21 | 2 | CANCELLATION |
| ... | ... | ... |

FIG.12

| SENSOR ID | EVENT EFFECTIVE TIME | | EVENT TYPE |
|---|---|---|---|
| | 1 | 2 | |
| 1 | 0:00 – 9:00 | 17:00 – 24:00 | 11 |
| 1 | 9:00 – 11:00 | 15:00 – 17:00 | 12 |
| 1 | 11:00 – 15:00 | – | 13 |
| 2 | 0:00 – 9:00 | 17:00 – 24:00 | 21 |
| 2 | 9:00 – 11:00 | 15:00 – 17:00 | 22 |
| 2 | 11:00 – 15:00 | – | 23 |
| ... | ... | ... | ... |

FIG.15

| | | | | | | | | |
|---|---|---|---|---|---|---|---|---|
| LOCAL EVENT GROUP 4 | SIGNIFI-CANCE | | | | | | | ... |
| | END TIME | | | | | | | ... |
| | START TIME | | | | | | | ... |
| | CAMERA ID | | | | | | | ... |
| LOCAL EVENT GROUP 3 | SIGNIFI-CANCE | 2 | 3 | 2 | 2 | 3 | 2 | ... |
| | END TIME | O+0 | C+0 | C+5 | O+0 | C+0 | C+5 | ... |
| | START TIME | O-5 | O+0 | C+0 | O-5 | O+0 | C+0 | ... |
| | CAMERA ID | 4 | | | 4 | | | ... |
| LOCAL EVENT GROUP 2 | SIGNIFI-CANCE | 2 | 3 | 2 | 2 | 3 | 2 | ... |
| | END TIME | O+0 | C+0 | C+3 | O+0 | C+0 | C+3 | ... |
| | START TIME | O-3 | O+0 | C+0 | O-3 | O+0 | C+0 | ... |
| | CAMERA ID | 3 | | | 3 | | | ... |
| LOCAL EVENT GROUP 1 | SIGNIFI-CANCE | 1 | — | — | 1 | — | — | ... |
| | END TIME | C+1 | — | — | C+1 | — | — | ... |
| | START TIME | O-1 | — | — | O-1 | — | — | ... |
| | CAMERA ID | 1 | | | 2 | | | ... |
| | SENSOR ID | 1 | | | 2 | | | ... |
| | EVENT TYPE | 1 | | | 2 | | | ... |

O: OCCURRENCE
C: CANCELLATION

FIG.19

| Field | Val1 | Val2 | Val3 | ... |
|---|---|---|---|---|
| EVENT ID | 1 | | | ... |
| EVENT TYPE | 1 | | | ... |
| SENSOR ID | 1 | | | ... |
| ALARM OCCURRENCE HOUR | 20010625 10:35:10 | | | ... |
| ALARM CANCELLATION HOUR | 20010625 10:40:51 | | | ... |
| EVENT START HOUR | 20010625 10:30:10 | | | ... |
| EVENT END HOUR | 20010625 10:45:51 | | | ... |
| CAMERA ID | 1 | 3 | 4 | ... |
| LOCAL EVENT ID | 1 | 1 | 1 | ... |
| LOCAL EVENT SIGNIFICANCE | 1 | 2 | 2 | ... |
| LOCAL EVENT ID | | 2 | 2 | ... |
| LOCAL EVENT SIGNIFICANCE | | 3 | 3 | ... |
| LOCAL EVENT ID | | 3 | 3 | ... |
| LOCAL EVENT SIGNIFICANCE | | 2 | 2 | ... |

FIG.21

| LOCAL EVENT ID | START TIME | END TIME | START ADDRESS | END ADDRESS | SIGNIFI-CANCE |
|---|---|---|---|---|---|
| 1 | 20010625 10:32:10 | 20010625 10:35:10 | 100 | 200 | 2 |
| 2 | 20010625 10:35:10 | 20010625 10:40:51 | 200 | 300 | 3 |
| 3 | 20010625 10:40:51 | 20010625 10:43:51 | 300 | 400 | 2 |
| ... | ... | ... | ... | ... | ... |

FIG.23

EVENT MANAGEMENT SYSTEM

BACKGROUND OF THE INVENTION

1. Field of the Invention

The present invention relates to event image recording systems and event image recording methods that continuously record images input from cameras, manage the image recorded at an alarm occurrence time and images that are recorded before and after the occurrence as an event image, and display the event image by means of a surveillance terminal connected to a network.

2. Description of the Related Art

In recent years surveillance systems have been in use that record images from cameras installed in a bank, parking area, convenience store, a large shop, or in the street. Among such systems, the apparatus recited in Laid-Open Japanese Patent Publication No.2000-339923 is one that, when triggered by a sensor alarm and such, records and manages images from around an alarm occurrence hour as an event and that furthermore retrieves and plays the event. This apparatus records camera images from around an alarm occurrence hour as an event image, and, when a number of events occur in a certain order, defines these events as a macro event. Moreover, with the above apparatus, it is possible to make management data that associates a number of event images and to monitor and analyze the situation of the recorded area quickly and with ease by, referring to such management data.

However, with the above conventional apparatus, when the surveillant wants to check both the suspicious behaviors that the surveillance object demonstrates while in a surveillance area and the suspicious behavior that the surveillance object demonstrates on his transfer path to the surveillance area, the problem arises that the operation to retrieve each image is complex and such retrieval is time-consuming.

SUMMARY OF THE INVENTION

The present invention aims to monitor the behavior of the surveillance object in an area under surveillance, and, in addition, the present invention aims to monitor the behavior of the surveillance object on a transfer path to the surveillance area.

To achieve the above objective, first, the present invention associates with an event, images that record the surveillance object's behavior in an area under surveillance and images that record the surveillance object's behavior on his transfer path to the area under surveillance. That is, the surveillance object's transfer path is guessed and time needed to move from a sensor to a camera's installation location is presumed on the basis of distance, and then the time period of the local event image from each camera is defined by way of time difference from the alarm occurrence hour. At an alarm occurrence time, event management data is made with reference to these definitions. Furthermore, when checking on event images, relevant event images can be picked up and played by making reference to the event management data.

By this means, it is possible to check the suspicious behavior that the surveillance object demonstrates near a sensor and on his transfer path thereto, and to narrow down in advance the time periods of images that record the surveillance object.

Secondly, the alarm occurrence state and the normal sate are managed such that an alarm triggers transition across the two states and a time period of local event images is defined based on the start hour and end hour of an alarm occurrence state. At an alarm occurrence time, event management data is made with reference to these definitions.

By this means, it is possible to record event images that include camera images from before and after an alarm generation state. As a result, it is possible to check the suspicious behavior of the surveillance object not only while the surveillance object is on his transfer path to a sensor object or such area but also while the surveillance object is on his transfer path to leave.

Thirdly, different events are defined depending on the alarm occurrence hour, and cameras and images from periods of time that best accommodate the situation are associated.

By this means, where the situation varies with the alarm occurrence time, that is, given that at a certain time the incidence of crime is low and an alarm is relatively insignificant and yet at another time the incidence of crime is high and an alarm is a significant event that notifies the occurrence of a crime, an event image can be made covering the most adequate periods in time that articulate the meaning of an alarm. As a result, it is possible to minutely check the situation of the alarm occurrence time. Furthermore, t is possible to utilize image recording areas without waste.

Fourthly, with camera images from a number of time periods that are associated with an event, significance is determined for each period of time. When an alarm is generated, event management data is made with reference to these determined significances.

By this means, images of high significance will be presented to the surveillant with priority. Moreover, when there is no free space in image recording areas where images are recorded, image of low significance will be subjected to over-recording, and consequently, images of high significance will be recorded without loss.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4 shows a schematic diagram illustrating an example of event definition contents according to Embodiment 1 of the present invention;

FIG. 6 shows a schematic diagram illustrating an example of event management data according to Embodiment 1 of the present invention;

FIG. 8 shows a schematic diagram illustrating an example of local event management data according to Embodiment 1 of the present invention;

FIG. 11 shows a schematic diagram illustrating an example of event definition contents according to Embodiment 2 of the present invention;

FIG. 12 shows a schematic diagram illustrating an example of the alarm table according to Embodiment 2 of the present invention;

FIG. 15 shows a schematic diagram illustrating an example of the event table according to Embodiment 3 of the present invention;

FIG. 19 shows a schematic diagram illustrating an example of event definition contents according to Embodiment 4 of the present invention;

FIG. 21 shows a schematic diagram illustrating an example of event management data according to Embodiment 4 of the present invention;

FIG. 23 shows a schematic diagram illustrating an example of local event management data according to Embodiment 4 of the present invention.

DETAILED DESCRIPTION OF THE PREFERRED EMBODIMENTS

With reference to the accompanying drawings now, embodiments of the present invention will be described.

Embodiment 1

Figure 1:
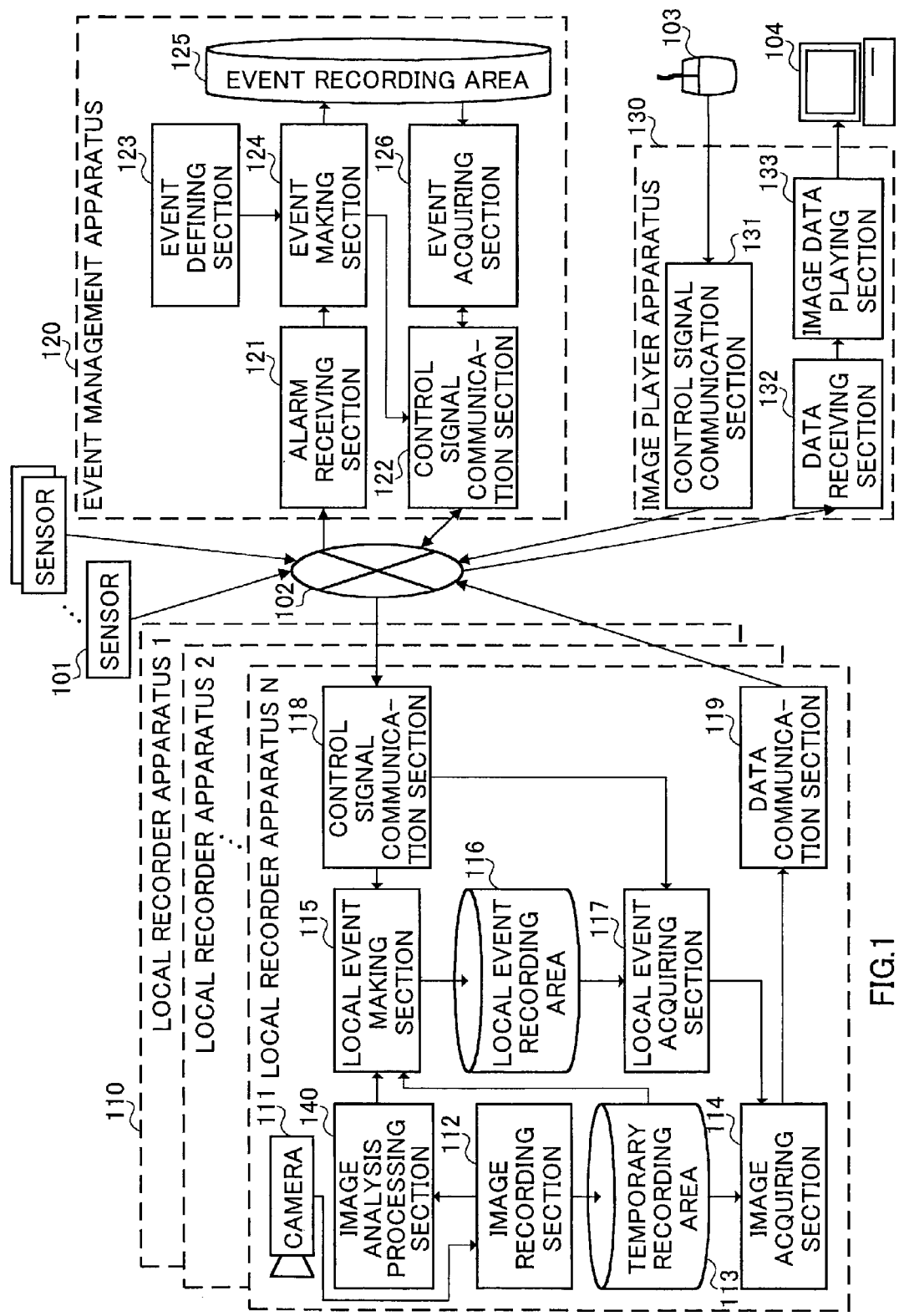
FIG. 1 shows a configuration diagram of the event image recording/playing system of Embodiment 1 of the present invention.

FIG. 1 is a configuration diagram of the event image recording/playing system of the present embodiment. In FIG. 1, 101 is a sensor that detects alarms; 110 is a local recorder apparatus that continuously records images recorded by cameras; 120 is an event management apparatus that manages images that a local recorder apparatus of option records at before, and after the time of alarm occurrence and their attributive information as event management data; 102 is a transmission network that associates a number of sensor 101's, a number of local recorder apparatus 110's, event management apparatus 120, and image player apparatus 130; 103 is an input apparatus; and 104 is a display apparatus.

Local recorder apparatus 110 consists of: surveillance camera 111; image recorder apparatus 112 that digitally encodes and records images from the surveillance camera; temporary recording area 113 that temporarily stores digitally encoded image data; image acquiring section 114 that reads out the image data in temporary recording area 113; local event making section 115 that makes local event management data that consists of image data associated to an event; local event recording area 116 that stores the local event management data; local event acquiring section 117 that acquires the local event management data from local event recording area 116; control signal communication section 118 that receives control signals from event management apparatus 120 and image player apparatus 130; data delivery section 119 that delivers the image data read out by image acquiring section 114 to transmission network 102; and image analysis processing section 140 that analyzes images and detects the movement of the recorded object.

Event management apparatus 120 consists of: alarm reception section 121 that receives alarm signals sent from sensor 101; control signal communication section 122 that sends control signals to local recorder apparatus 110 of choice and receives control signals from image player apparatus 130; event defining section 123 that defines cameras and periods of time of images from these cameras; event making section 124 that in response to an alarm refers to event defining section 123 and makes event management data; event recording area 125 that stores the event management data; and event acquiring section 126 that acquires the event management data from event recording area 116.

Image player apparatus 130 consists of: control signal communication section 131 that converts instructions from input apparatus 103 into control signals and sends the control signals to local recorder apparatus 110 and event management apparatus 120; data receiving section 132 that receives image data from local recorder apparatus 110; and player section 133 that plays the image data.

Figure 2:
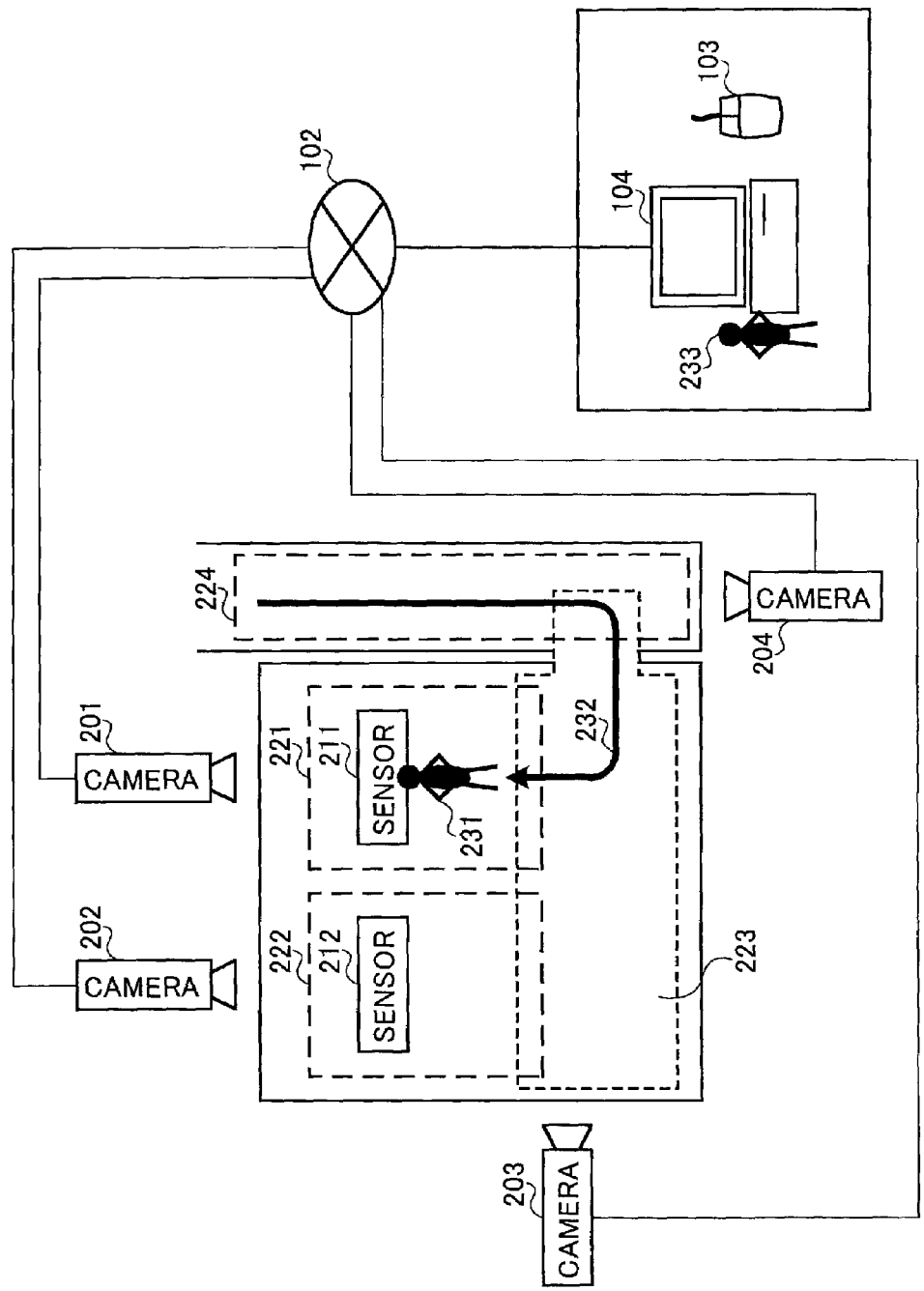
FIG. 2 shows a schematic diagram illustrating a specific implementation sample of the event image recording/playing system of Embodiment 1 of the present invention.

FIG. 2 is a sample case of checking images from surveillance cameras installed in ATMs in a bank by using Embodiment 1. In FIG. 2, 201 through 204 are surveillance cameras; 211 and 212 are sensors installed in ATM terminal apparatus; 221 to 224 are recording areas that are subject to recording by camera 201 to 204 respectively; 231 is the surveillance object; 232 is a putative transfer path of surveillance object 231; and 233 is the surveillant.

When surveillance object 231 performs an illegal operation with the ATM terminal apparatus with sensor 211, sensor 211 immediately issues an alarm occurrence signal. In this case, surveillant 233 is able to minutely comprehend the situation by checking not only the action that surveillance object 231 cause to the ATM terminal but also surveillance object 231's transfer path to the ATM terminal apparatus as well as the suspicious behavior that surveillance object 231 demonstrates on the path such as contact with a partner.

Assuming that the path that surveillance object 231 takes to the ATM terminal is transfer path 232 that crosses area 224, area 223, and area 221 in this order, the assumption can also be made that surveillance object 231 is caught in the image from surveillance camera 201 that records area 221 at the alarm occurrence hour, in the image from surveillance camera 203 that records area 223 at an earlier hour, and in the image from surveillance camera 204 that records area 224 at a still earlier hour. On the grounds of these assumptions, FIG. 3 shows cameras that have recorded the behavior of surveillance object 231 and periods of time that include relevant images.

Figure 3:
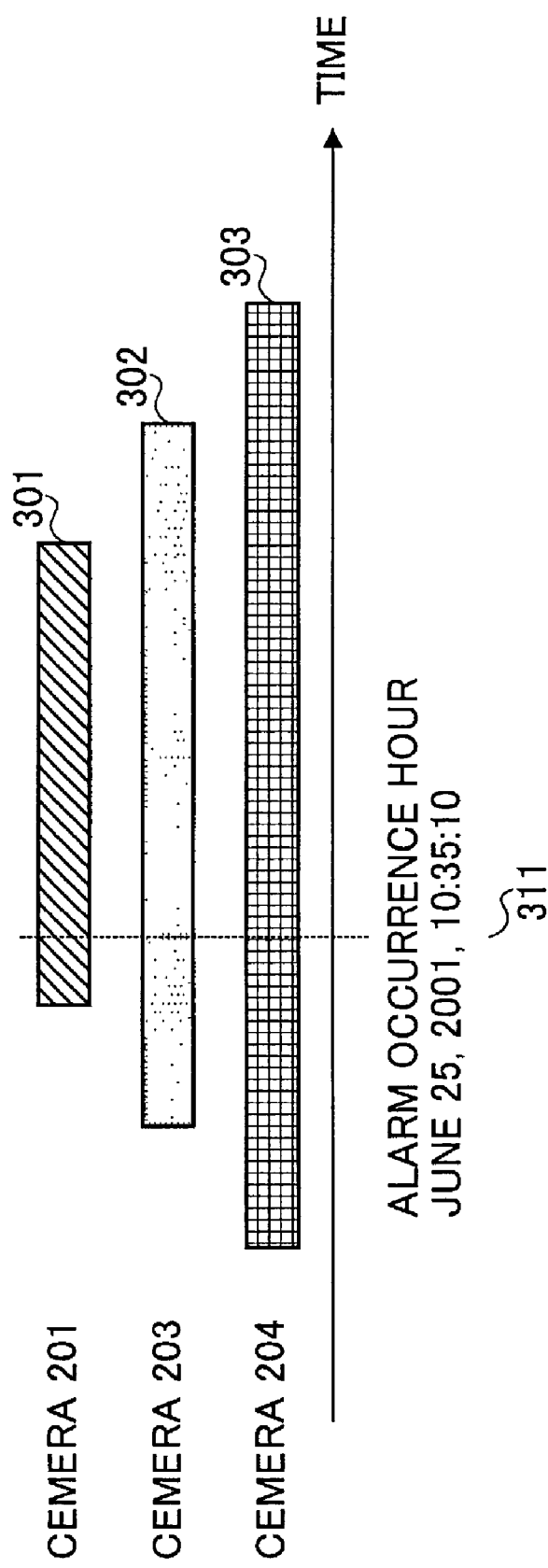
FIG. 3 shows a schematic diagram showing an example of a time period with respect to each camera image included in an event image according to Embodiment 1 of the present invention.

In FIG. 3, of all images recorded by camera 201, 203, and 204, each of 301 to 303 is respectively a period of time of images related to an alarm generated from sensor 211. 311 is the time an alarm is generated from sensor 211. The time period of the image from camera 201 that records area 221 that includes sensor 211 is from one minute before to five minute after alarm occurrence time 311. The time period of the image from camera 203 that records area 223 distant from sensor 211 is from three minutes before to eight minute after alarm occurrence time 311. The time period of the image from camera 204 that records area 224 further distant from sensor 211 is from five minutes before to ten minutes after alarm occurrence time 311. By viewing these images simultaneously or alternately, surveillant 233 is able to check the suspicious behavior that surveillance object 231 demonstrates in area 221, 223, and 224.

FIG. 4 shows an example of event definition contents predefined in event defining section 123 in order to make event management data such as above. In FIG. 4, an optional number of local events are defined with respect to the event type and sensor ID. A local event refers to each camera's image including its attributive information that is related to an event. A local event definition consists of camera IDs and start/end times, each expressed by way of time difference from the relevant alarm occurrence time. In time difference parameters, "−1" means one minute before the alarm occurrence time. For instance, event type "1" corresponds to an alarm generated from sensor ID "1." Event type "1" consists of the image from camera ID "1" taken over the period of time from one minute before to five minutes after the alarm occurrence time, the image from camera ID "3" taken over the period of time from three minutes before to eight minutes after the alarm occurrence time, and the image from camera ID "4" taken over the period of time from five minutes before to ten minutes after the alarm occurrence time.

Next, the operation of the present embodiment will be described using FIG. 1. Camera 111 installed in each local recorder apparatus constantly records its surveillance object area and sends image signals to image recording section 112. Image recording section 112 digitally encodes the image signals and records them into temporary recording area 113. Temporary recording area 113 is made a circular recording structure, and so after all recording areas are used for recording, image recording section 112 starts recording over the area that stores the oldest image data.

The operation at the time of alarm occurrence will be described using FIG. 2. Sensor 211 detects the occurrence of an alarm and sends an alarm signal to alarm reception section 121. Alarm reception section 121 detects the sensor ID "1" from the alarm signal and sends the sensor ID to event making section 124. Event making section 124 makes event management data following the procedure flow shown in FIG. 5.

Figure 5:
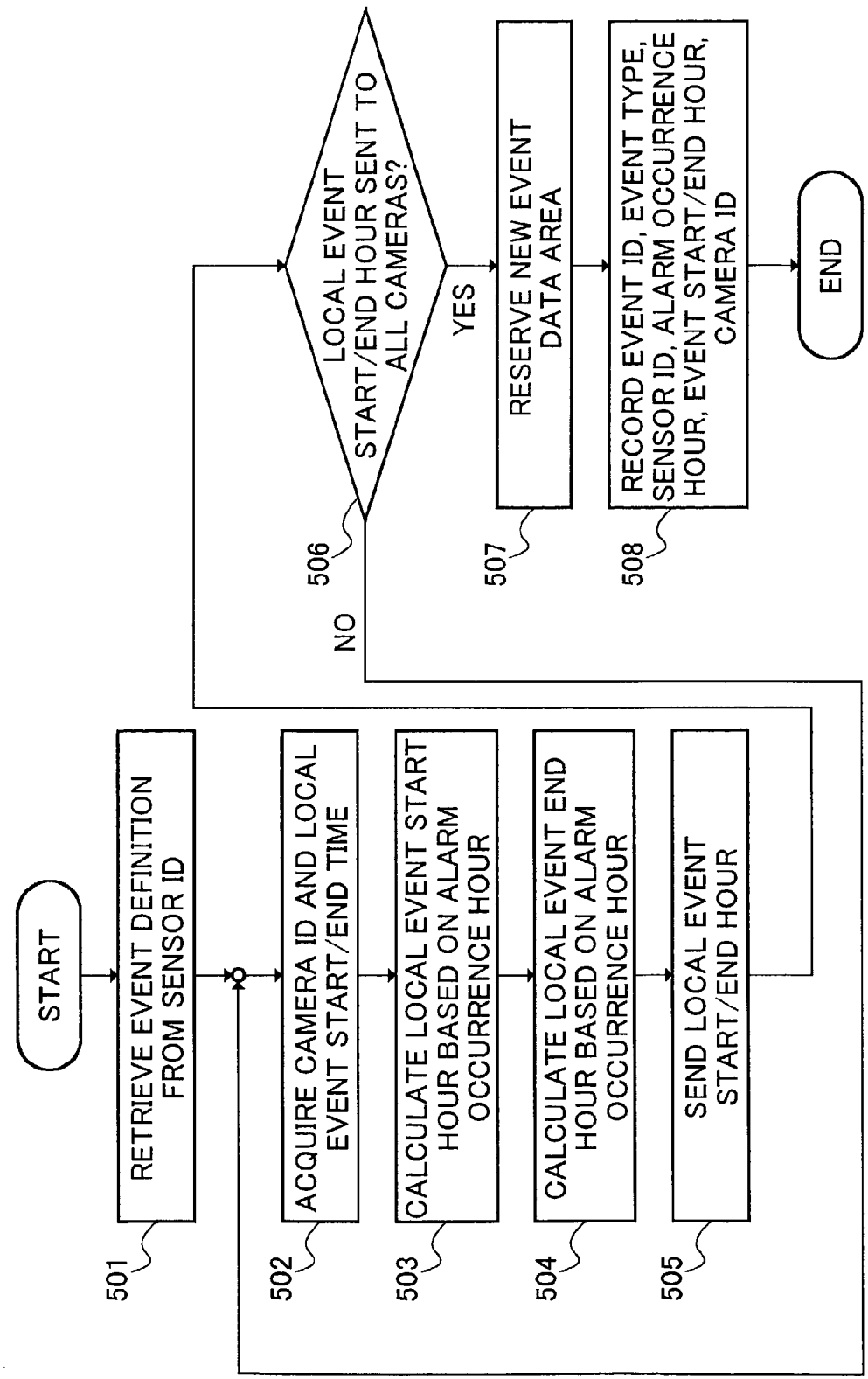
FIG. 5 shows a flow chart of the event management data making process according to Embodiment 1 of the present invention.

Using FIG. 5, the operation of event making section 124 will be described below. Event making section 124 refers to event definition contents predefined by event defining section 123 such as shown in FIG. 4 and retrieves event definitions that correspond to the sensor ID "1" (501). As a result of the retrieval, from among all event definitions under event type "1," the camera ID "1," the local event start time "−1," and the local event end time "+5" are acquired (502). Based on alarm occurrence hour 311 "Jun. 25, 2001, 10:35:10" and the local event start time "−1," the local event start hour "Jun. 25, 2001, 10:34:10" is calculated (503). Similarly, based on the above alarm occurrence hour and the local event end time "+5," the local event end hour "Jun. 25, 2001, 10:40:10" is calculated, and the camera ID and local event start/end times are sent to control signal communication section 122 (504). Following this, items under local event definitions 2 and 3 are processed in the same way, and 502 through 504 are repeated until all local events are processed (505). A storage area is reserved in event recording area 126 (506), where the event ID "1," the event type "1," the sensor ID "1," the alarm occurrence hour "Jun. 25, 2001, 10:35:10," the event start/end hours, and the camera IDs "1," "3," and "4" are recorded (507) to conclude the operation. Incidentally, an event ID is a serial number issued in the order events are made. Also, an event start hour is the earliest hour of all local events, which in this case is the local event start hour "Jun. 25, 2001, 10:30:10" of camera ID "4." Similarly, an event end hour is the latest hour, which in this case is the local event end hour "Jun. 25, 2001, 10:45:10" of camera ID "4."

FIG. 6 shows an example of event management data made in the above manner. In FIG. 6, a local event ID is a serial number issued in the order local events are made in local recorder apparatus 110 of the corresponding camera ID. Control signal communication section 122 sends local event start/end hours to each local recorder apparatus 110 that corresponds to each of the camera IDs "1," "3," and "4." Control signal communication section 118 in each local recorder apparatus 110 sends the local event start/end hours to each local event making section 115. Local event making section 115 makes local event management data following the procedure flow of FIG. 7.

Figure 7:
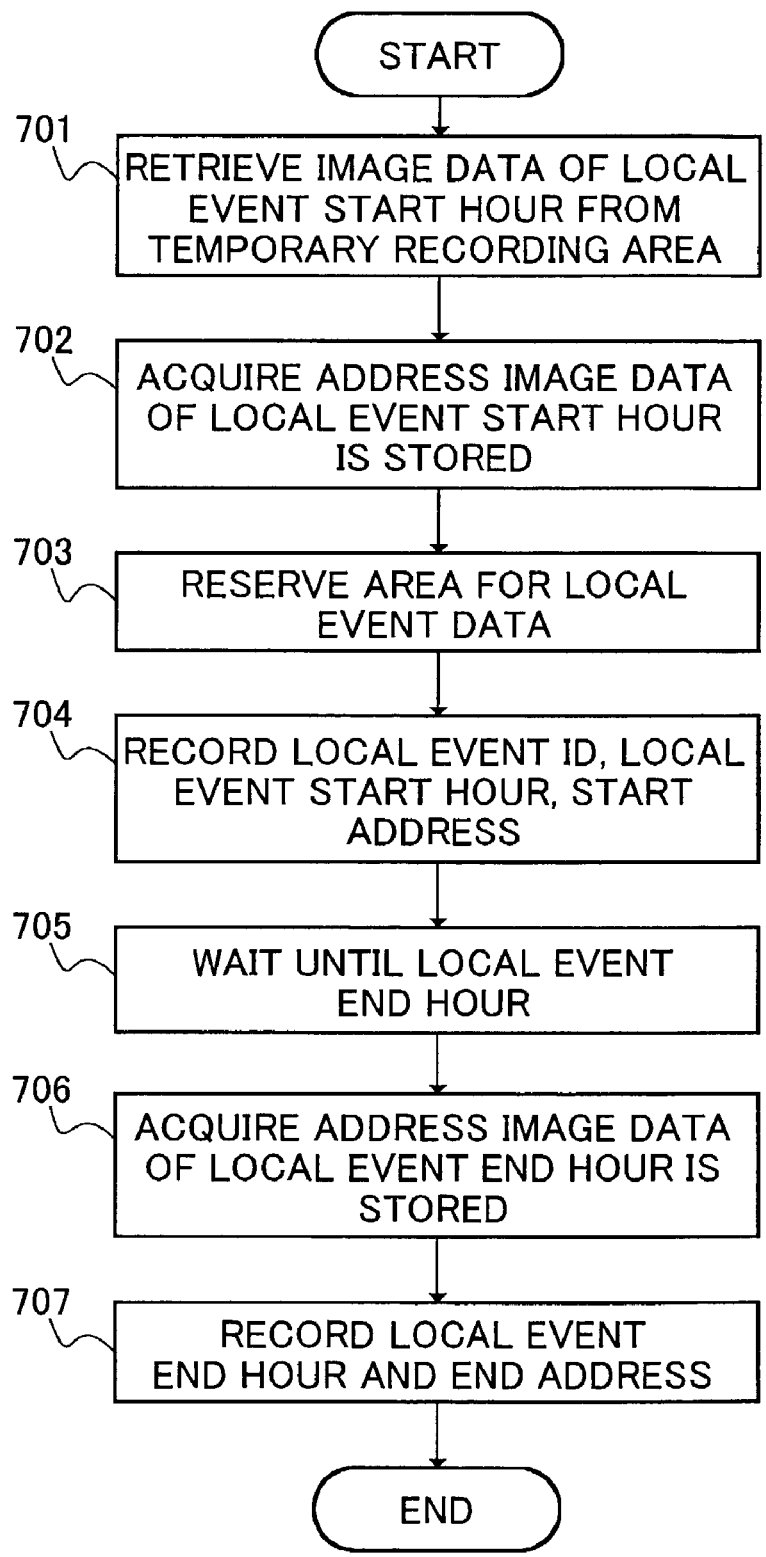
FIG. 7 shows a flow chart of the local event management data making process according to Embodiment 1 of the present invention.

Using FIG. 7, the operation of local event making section 115 of local recorder apparatus 110 with camera 201 with the camera ID "1" will be described below. From first recording area 113, local event making section 115 retrieves the image that image recording section 112 recorded at the local event start hour "Jun. 25, 2001, 10:34:10" (701) and acquires the address "100" where the relevant image is stored (702). Local event making section 115 next reserves a storage area in local event recording area 116 (703) and, after recording the local event ID "1," local event start hour, and start address (704), waits until the local event end hour (705). Local event making section 115 then acquires the address where the image data recorded at the local event end hour is stored (706) and concludes the process by recording the local event end time and end address. FIG. 8 shows an example of local event management data made in the above manner.

The operation to play event images made in the above manner with image player apparatus 130 will be described. Control signal communication section 131 sends the event ID of an event that surveillant 233 selects by means of input apparatus 103 to event management apparatus 120. In event management apparatus 120, control signal communication section 122 receives the event ID and sends it to event acquiring section 125. From event recording area 126, event acquiring section 125 retrieves event management data that corresponds to the received event ID, acquires the camera ID and local event ID under the event management data, and sends the local event ID via control signal communication section 122 to local recorder apparatus 110 of each camera ID.

In local recorder apparatus 110, control signal communication section 118 receives the local event ID and sends it to local event acquiring section 117. From local event recording area 116, local event acquiring section 117 retrieves local event management data that corresponds to the local event ID and acquires the image start address for the local event management data and sends it to image acquiring section 114. Image acquiring section 114 reads out image data of the image start address which is in temporary recording area 113, and sends the read-out image data via data sending section 119 to image player apparatus 130. In image player apparatus 130, image data receiving section 132 receives the image data, and image data player section 133 exercises decoding processing to display images on display section 104.

As described above, with the present embodiment, cameras and the time periods of the images from these cameras that are related to an event are predefined in event defining section 123, local recorder apparatus 110 holds local event images related to an alarm occurrence time with their management data, and event management apparatus 120 holds the event management data which combines local event management data from each local recorder apparatus 110, whereby, for instance, surveillant 233 needs not to retrieve the behavior that surveillance object 231 demonstrates at the time of alarm occurrence and the behavior that surveillance object 231 demonstrates on transfer path 232 from each camera on the basis of the alarm occurrence time, and thus surveillant 233 is able to quickly comprehend the situation.

When for instance surveillance object 231 near sensor 211 has a partner on the watch in area 224 which is recorded by camera 204, by associating the alarm occurrence hour with a number of camera images from the same hour, it becomes possible to check the partner's suspicious behavior as well.

With the present embodiment, a time period of local event images is recorded in event definition contents in advance. However, by providing local recorder apparatus 110 with image analysis processing section 140, it is possible to determine a time period of local event images according to the situation surrounding the surveillance object.

For instance, image analysis processing section 140 detects the movement of a camera-recorded object and holds information that contains movement as attributive information of the image. At an alarm occurrence time, the periods of time of local event images are calculated using the present embodiment. Of the images from around the above periods of time, local event making section 115 selects a series of images that hold information with movement and makes event management data that manages these images as local event images. By this means, it is possible to associate all images that show the surveillance object's transfer as images with movement and to omit images that do not show the surveillance object.

Embodiment 2

With Embodiment 1, provided that a sensor notifies alarm occurrence alone, an event start hour and end hour are both defined by way of time difference from the alarm occurrence hour. However, according to the event image recording/playing system of the present embodiment, provided that a sensor notifies alarm occurrence as well as alarm cancellation, the start hour for a camera image of event data is determined on the basis of alarm occurrence hour and likewise the end hour is determined on the basis of alarm cancellation hour.

Figure 9:
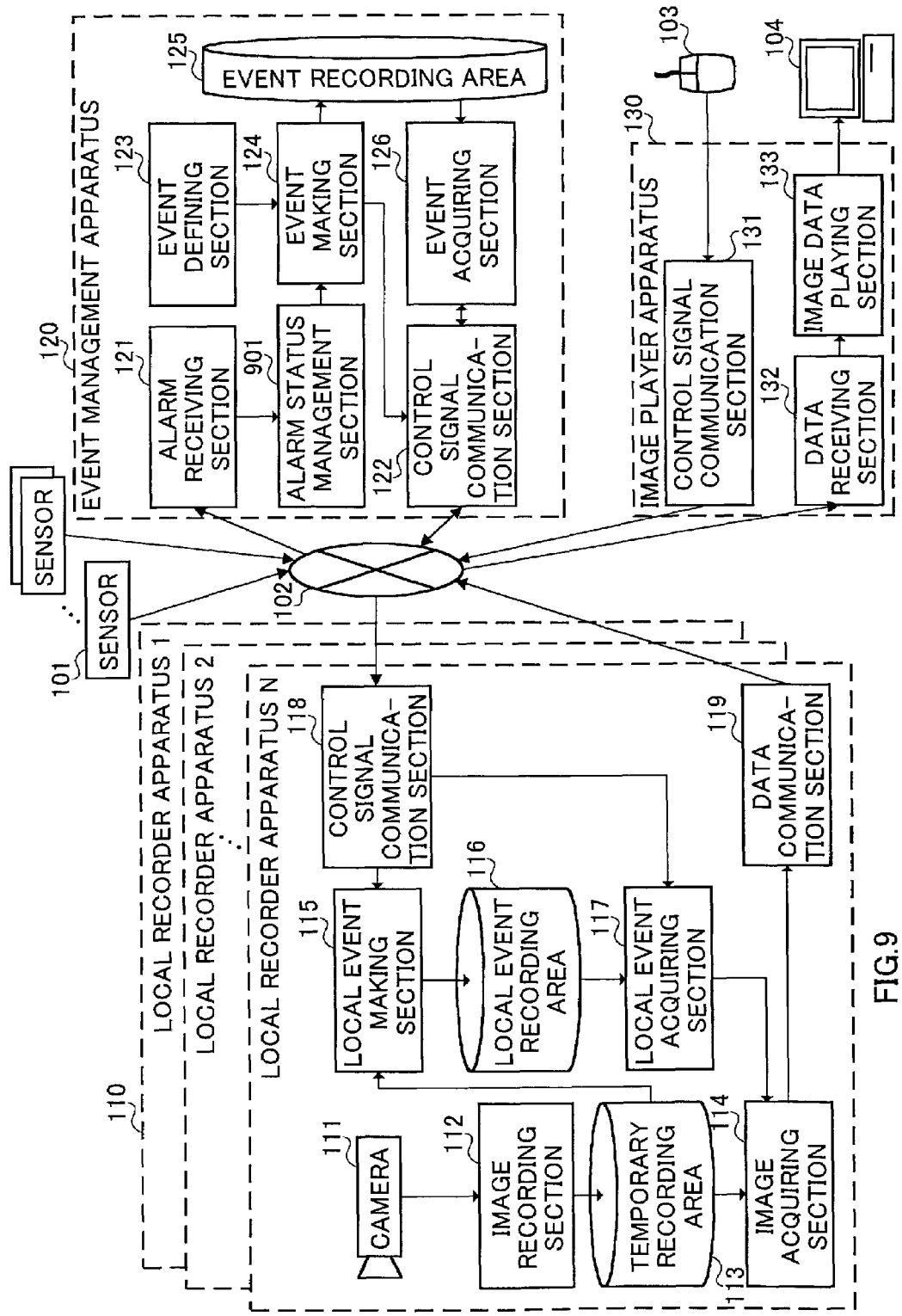
FIG. 9 shows a configuration diagram of the event image recording/playing system according to Embodiment 2 of the present invention.

FIG. 9 shows a configuration diagram of the event image recording/playing system of the present embodiment. In FIG. 9, event management apparatus 120 is identical with that of Embodiment 1, the difference between the two being that to the former alarm status management section 901 has been added that manages the status of alarms by identifying whether an alarm signal sent from a sensor is one of alarm generation or one of alarm cancellation. The operations of other components including local recorder apparatus 110, sensor 101, transmission network 102, and image player apparatus 130 are the same as those of Embodiment 1.

Figure 10:
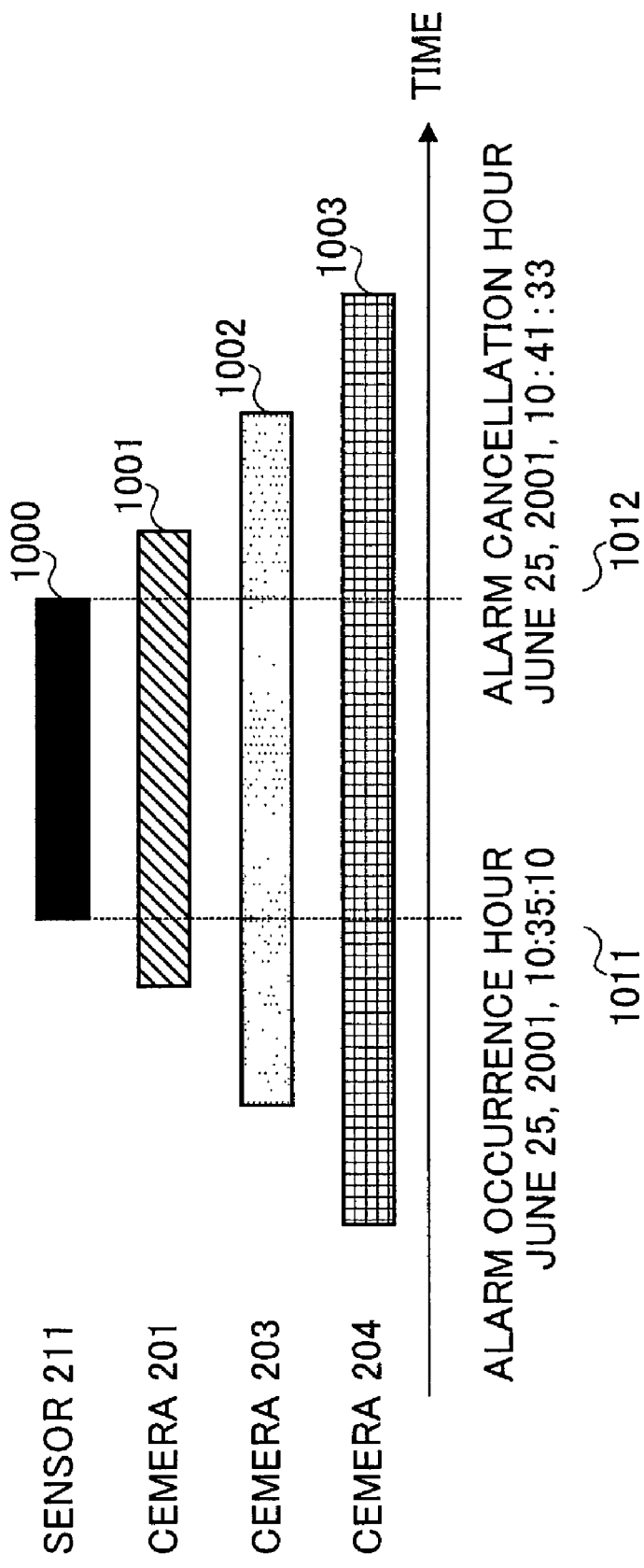
FIG. 10 shows a schematic diagram showing an example of a time period with respect to each camera image included in event images according to Embodiment 2 of the present invention.

In FIG. 2, the conditions are given that when surveillance object 231 performs an illegal operation with the ATM terminal apparatus, sensor 211 notifies alarm occurrence and thereafter sends an alarm cancellation signal when surveillant object 231 finishes the operation. With the present system, the precise hour that surveillance object 231 leaves the scene can be learned, and consequently, it is possible to film and record the suspicious behavior that surveillance object 231 demonstrates on his transfer path to the ATM terminal apparatus as well as the transfer path that surveillance object 231 takes upon leaving and the suspicious behavior that surveillance object 231 demonstrates while on the path. Assuming that in FIG. 2 the path that surveillance object 231 takes upon leaving from the ATM terminal apparatus is the reverse of transfer path 232, the assumption can also be made that surveillance object is caught in the image from camera 201 at the hour of alarm occurrence, in the image from camera 203 at a later hour, and in the image from camera 204 at a still later hour. On the basis of these assumptions, FIG. 10 shows cameras that record the behavior of surveillance object 231 and the periods of time that include relevant images. In FIG. 10, of all images recorded by camera 201, 203, and 204, 1001 to 1003 each respectively denotes a time period of images related to an alarm that sensor 211 generates. 1000 is a time period over which sensor 211 generates an alarm. 1011 is the alarm occurrence hour of sensor 322. 1022 denotes the alarm cancellation hour of sensor 322.

FIG. 11 shows an example of event definition contents that event defining section 123 defines in order to make an event image such as above. In FIG. 11, the items of start/end times "Occurrence −1" and "Cancellation +1" for a local event image means one minute before and one minute after the alarm occurrence hour respectively.

Upon receiving an alarm signal from sensor 101, alarm status management section 901 refers to the alarm table shown in FIG. 12 to find out the sensor ID and whether the received signal is one of alarm occurrence or one of alarm cancellation. In FIG. 12, upon receiving alarm signal "10," alarm status management section 901 will learn that an alarm has "occurred" from sensor ID "1." Upon receiving further alarm occurrence, alarm status management section 901 will store the occurrence hour and manages the alarm-generating sensor as in an alarm state.

Figure 13:
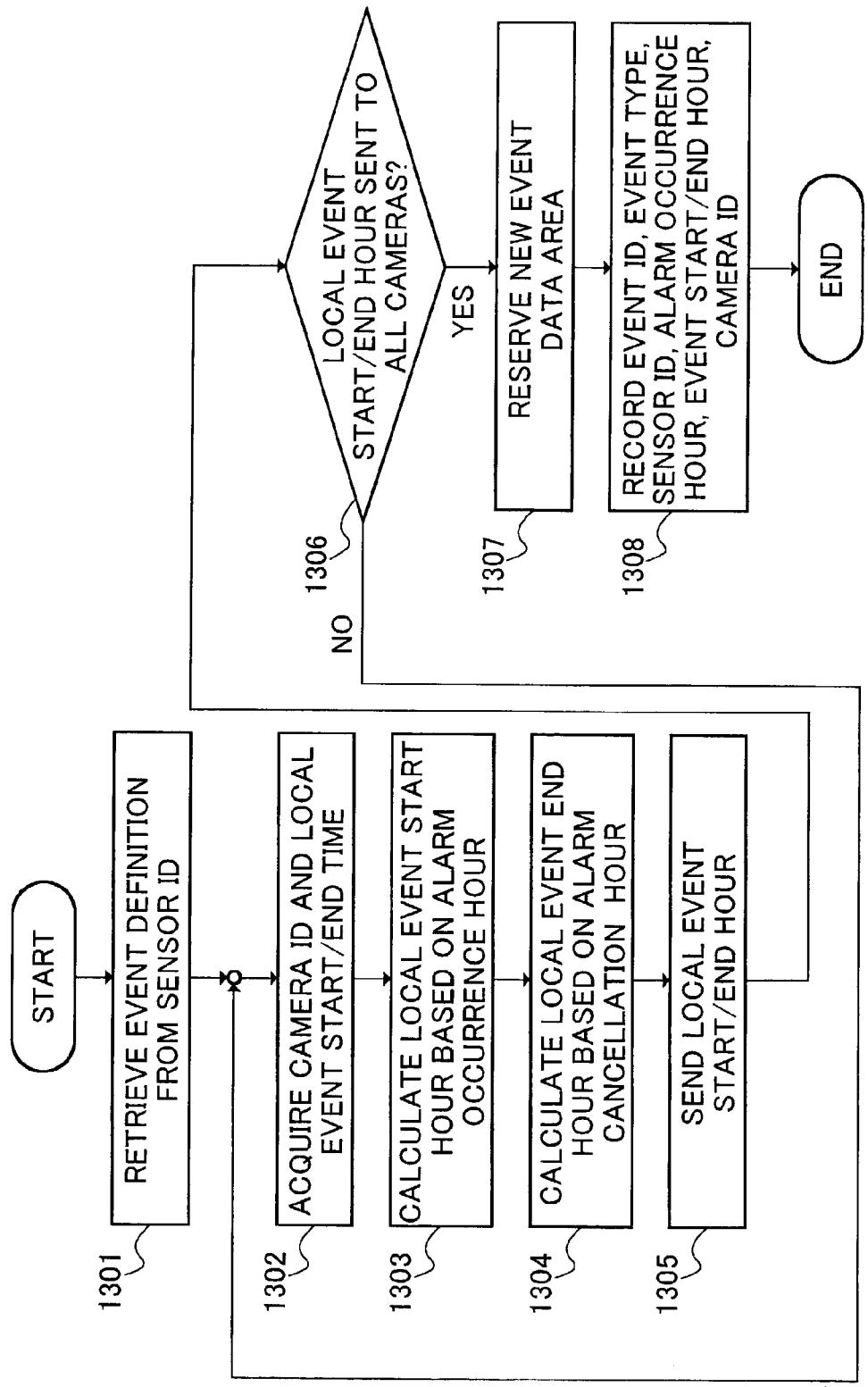
FIG. 13 shows a flow chart of the event management data making process according to Embodiment 2 of the present invention.

Event making section 124 makes event management data following the procedure flow shown in FIG. 13. The flow of FIG. 13 is identical with that of event making section 124 of Embodiment 1 shown in FIG. 5 with the exception of process 1304 that calculates the local event end hour on the basis of alarm cancellation hour and local event end time differences. The operation of local recorder apparatus 110 for making local event management data is identical with that of Embodiment 1.

As describe above, with the present embodiment, a sensor that notifies alarm occurrence and alarm cancellation enables surveillant 233 to minutely check the behavior that surveillance object 231 demonstrates on his transfer path to the ATM terminal apparatus as well as the behavior that surveillance object 231 demonstrates on his transfer path upon leaving the ATM terminal.

Moreover, with the present embodiment, a local event start time is defined based on an alarm occurrence hour, and likewise a local event end time is defined based on an alarm cancellation hour. However, if a local event start time is defined based on an alarm cancellation hour and local event end time is defined based on an alarm occurrence hour, it is possible to associate images from time periods with no alarm occurrence with an event.

Embodiment 3

With Embodiment 1, one event is defined per sensor and event management data is made accordingly. The event image recording/playing system according to the present embodiment defines a number of events per sensor depending on the hour of alarm occurrence, which makes it possible to associate the most adequate images depending on the situation of the surveillance area. For instance, if in FIG. 2 sensor 211 is a man-detecting sensor that generates an alarm when a person comes close, alarms will continue to be generated during crowded hours. Furthermore, for instance, while bank windows are in service, a security guard may be present, which makes the incidence of crime low, and consequently the time width of an event image to record may be set short. On the other hand, if bank windows are not in service or if it is late at night with few people in and out, the incidence of crime is high, and consequently the time width of an event image to record needs to be set long.

Figure 14:
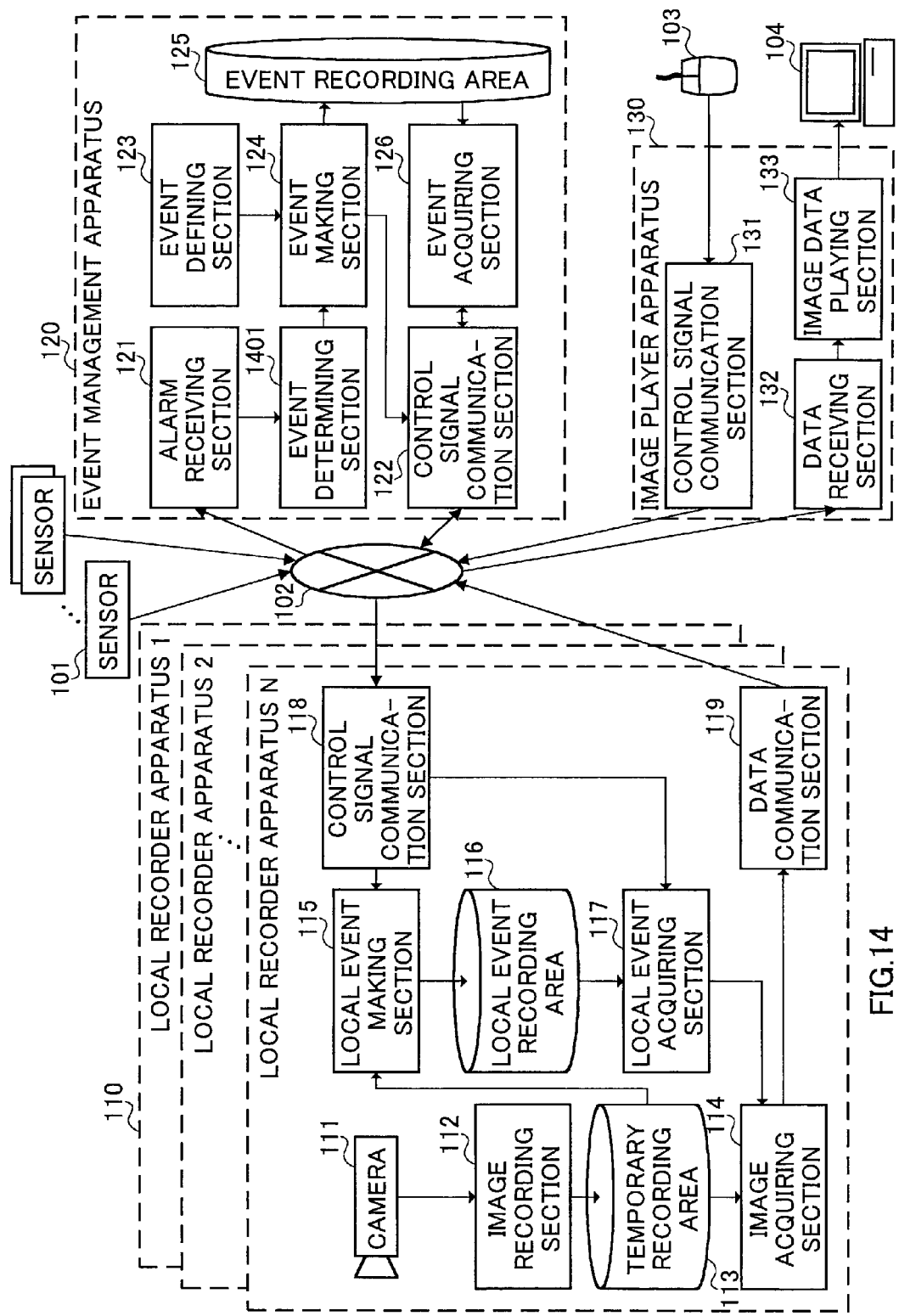
FIG. 14 shows a configuration diagram of the event image recording/playing system according to Embodiment 3 of the present invention.

FIG. 14 is a configuration diagram of the event recording/playing system of the present embodiment. In FIG. 14, event management apparatus 120 is identical with that of Embodiment 1, the difference between the two being that to the former event determining section 1401 has been added that determines the event type based on the sensor ID identified in alarm reception section 121 and the alarm occurrence hour and that sends the event type to event making section 124. The other components including local recorder apparatus 110, sensor 101, transmission network 102, and image player apparatus 130 are the same as those of Embodiment 1 in terms of their operation.

Based on the sensor ID and alarm occurrence hour and by referring to event table shown in FIG. 15, event determining section 1401 determines event types. In FIG. 15, the event table consists of sensor IDs for sensors that generate an alarm, event effective times that are required to specify event types based on the alarm occurrence hour, and event types. When for instance the sensor ID "1" and the alarm occurrence hour "Jun. 25, 2001, 10:35:10" are received, the received hour is included in the event effective time "9:00-11:00" and consequently the event type will be determined "12." The operation thereafter is the same as that of Embodiment 1. That is, based on the received event type, event making section 124 refers to event definition contents and makes event management data and sends local event making instructions to each local recorder apparatus 110. The operation of local recorder apparatus 110 to make local event management data is the same as that of Embodiment 1.

Figure 16:
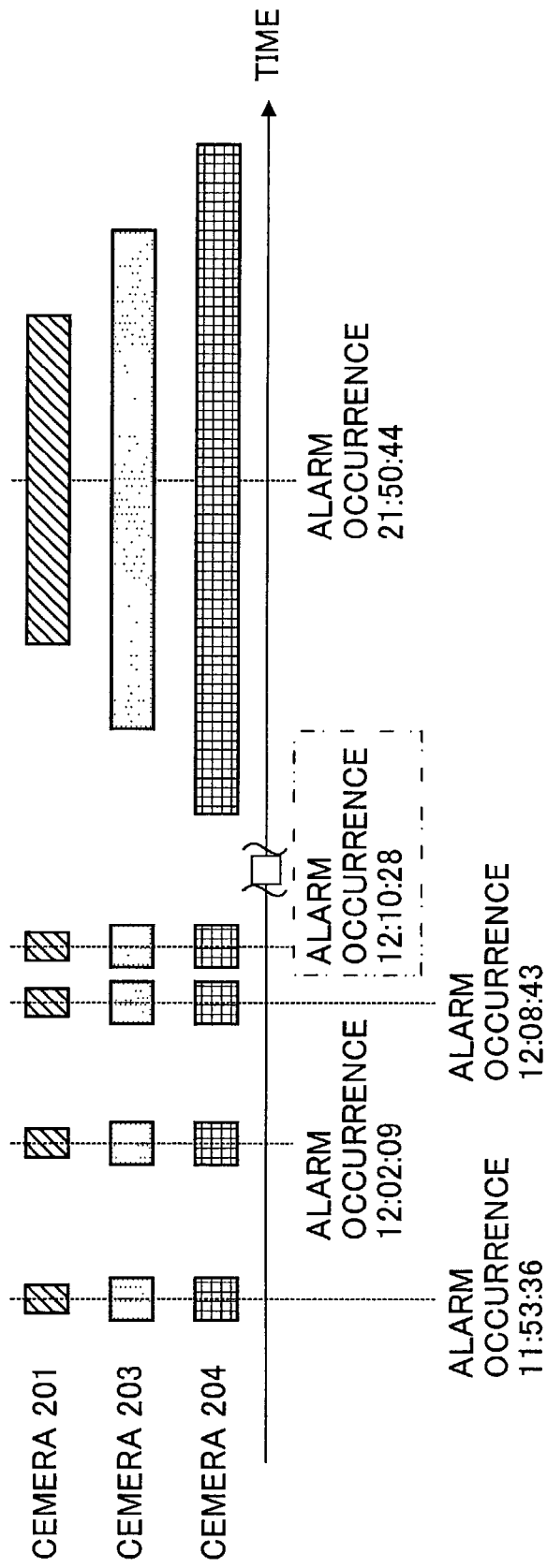
FIG. 16 shows a schematic diagram showing an example of a time period with respect to each camera image included in event images according to Embodiment 3 of the present invention.

FIG. 16 shows the time periods of event images made in the above manner. In IFG. 16, the event that corresponds to an alarm that occurred during the time period of "11:00-15:00" consists of relatively short-term images. On the other hand, the event corresponding to an alarm that occurred during the period of "17:00-24:00" occupies a much longer term.

As described above, according to the present embodiment, with each sensor different events are defined depending on the sensor's alarm occurrence hour, and consequently, even where the situation varies with time, it is possible to accommodate the situation and associate adequate image data.

Incidentally, although with the present embodiment two events are defined per alarm, the present embodiment is not limited thereto and accordingly it is possible to define three or more events per alarm.

Moreover, although with the present embodiment a sensor and its alarm occurrence hour define an event, it is also possible to define and make an event using a noise sensor and a temperature sensor and still achieve the same effect.

Embodiment 4

Figure 17:
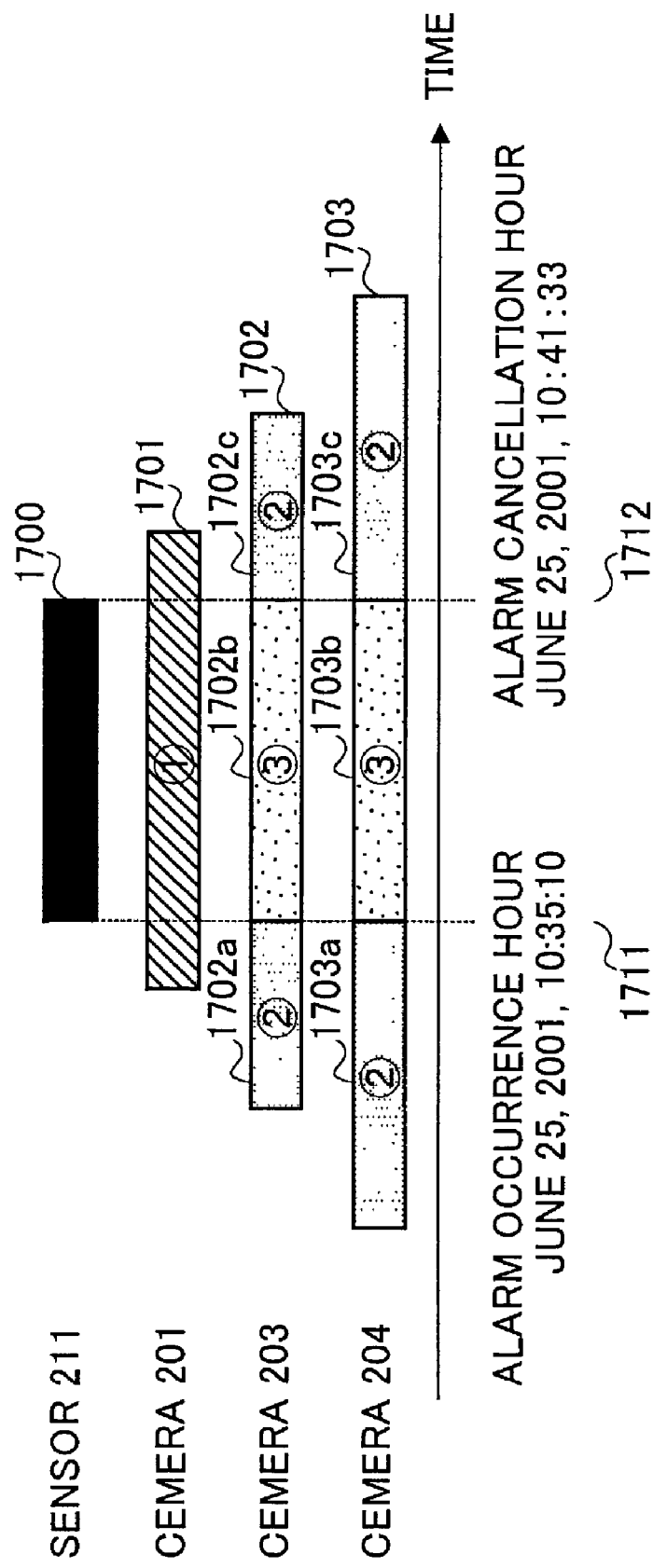
FIG. 17 shows a schematic diagram showing an example of a time period with respect to each camera image included in event images according to Embodiment 4 of the present invention.

With Embodiments 1 through 3, local event images from cameras included in an event are defined as and made into one continuous image data. The present embodiment divides this into a number of periods of time and each image period is provided with a parameter that determines its significance to the corresponding event. Moreover when the images are played, images of high significance will be played with priority, and upon recording new images, based on the circular recording structure, periods of images of low significance will be subject to over-recording. FIG. 17 shows examples of the time periods of event images made by the embodiment shown in FIG. 2. In FIG. 17, with respect to time period 1700 over which a sensor generates an alarm, images from each camera's time period 1701, 1702, and 1703 are event images. Camera 201 with the camera ID "1" records the behavior of surveillance object 231 at the time of alarm occurrence, and so time period 1701 is set at "1," which indicates the highest level of significance. Of time periods 1702 and 1703 of the images from camera 203 with the camera ID "3" and from camera 204 with the camera ID "4," time periods 1702a, 1702c, 1703a, and 1703c record the behavior of surveillance object 231 on his transfer path to and from the ATM terminal apparatus, and the level of significance lowers by one and is set at "2." Furthermore, during period 1700 over which an alarm is generated, surveillance object 231 is not in area 223 or in area 224, and so time periods 1702b and 1703b are set at "3," which indicates the lowest level of significance.

Figure 18:
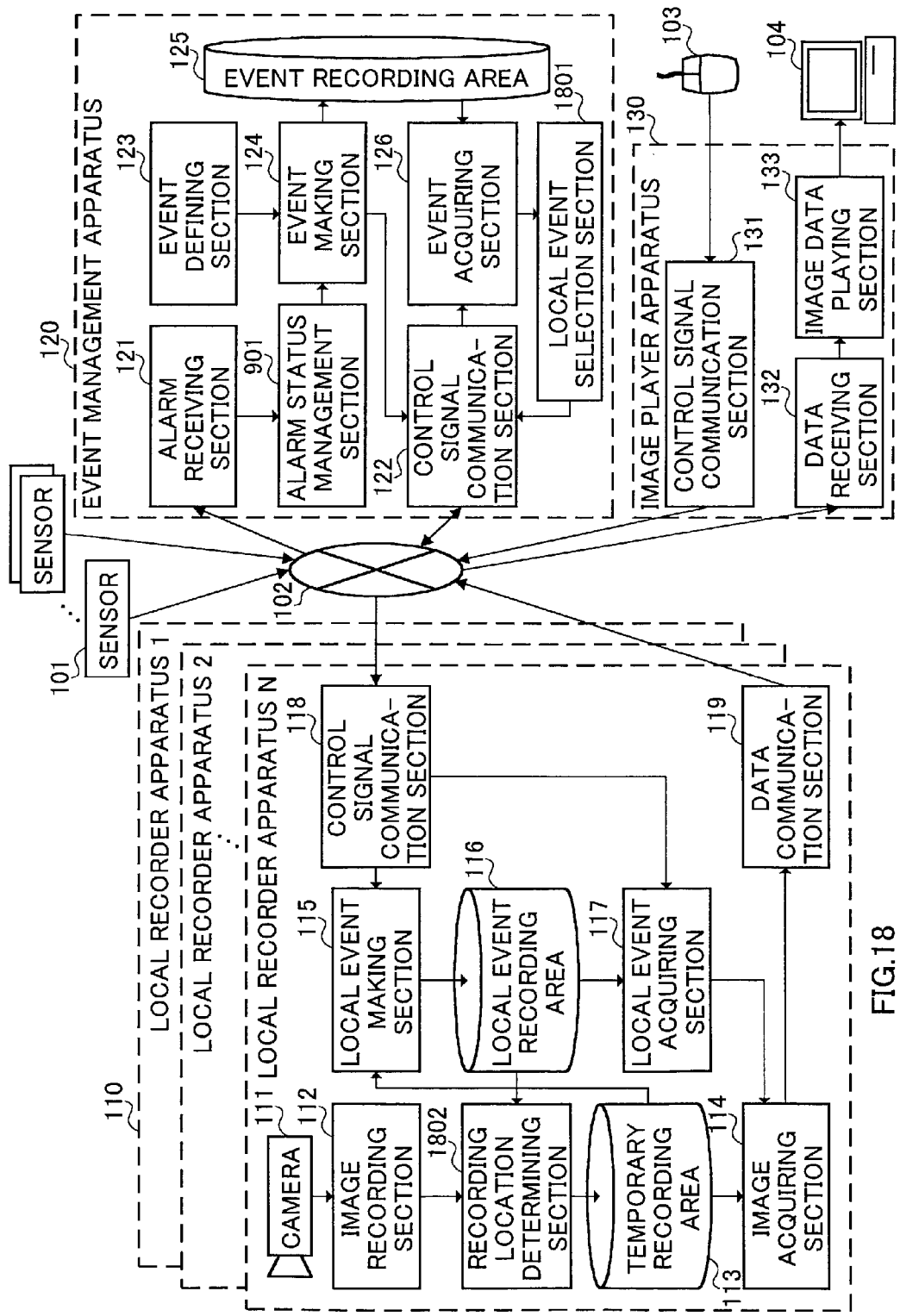
FIG. 18 shows a configuration diagram of the event image recording/playing system according to Embodiment 4 of the present invention.

FIG. 18 shows a configuration diagram of the event image recording/playing system of the present embodiment. In FIG. 18, event management apparatus 120 is identical with that of Embodiment 2, the difference between the two being that to the former local event selection section 1801 has been added that selects local events of specified significance with priority. Furthermore, local recorder apparatus 130 is identical with that of Embodiment 2, the difference between the two being that to the former location determining section 1802 has been added that determines recording locations for recording image data of low significance when temporary recording area 113 has no free space.

Event defining section 123 makes event definition contents such as shown in FIG. 19 into which the item of significance is further added. In FIG. 19, a local event group is defined for each camera. Each local event group consists of one or several local events, with each of which significance is determined. With regard to the levels of significance, "1" is the highest, with "2" and "3" following in order. For instance, local event group 2 under event type "1" is camera images from camera ID "3," and consists of a local event of significance "2" from the image covering the period from one minute before to three minutes after an alarm occurrence time, a local event of significance "3" from the image covering the period from the alarm occurrence time to the alarm cancellation time, and a local event of significance "2" from the image covering the period from the alarm cancellation time to three minutes after the alarm cancellation.

Figure 20:
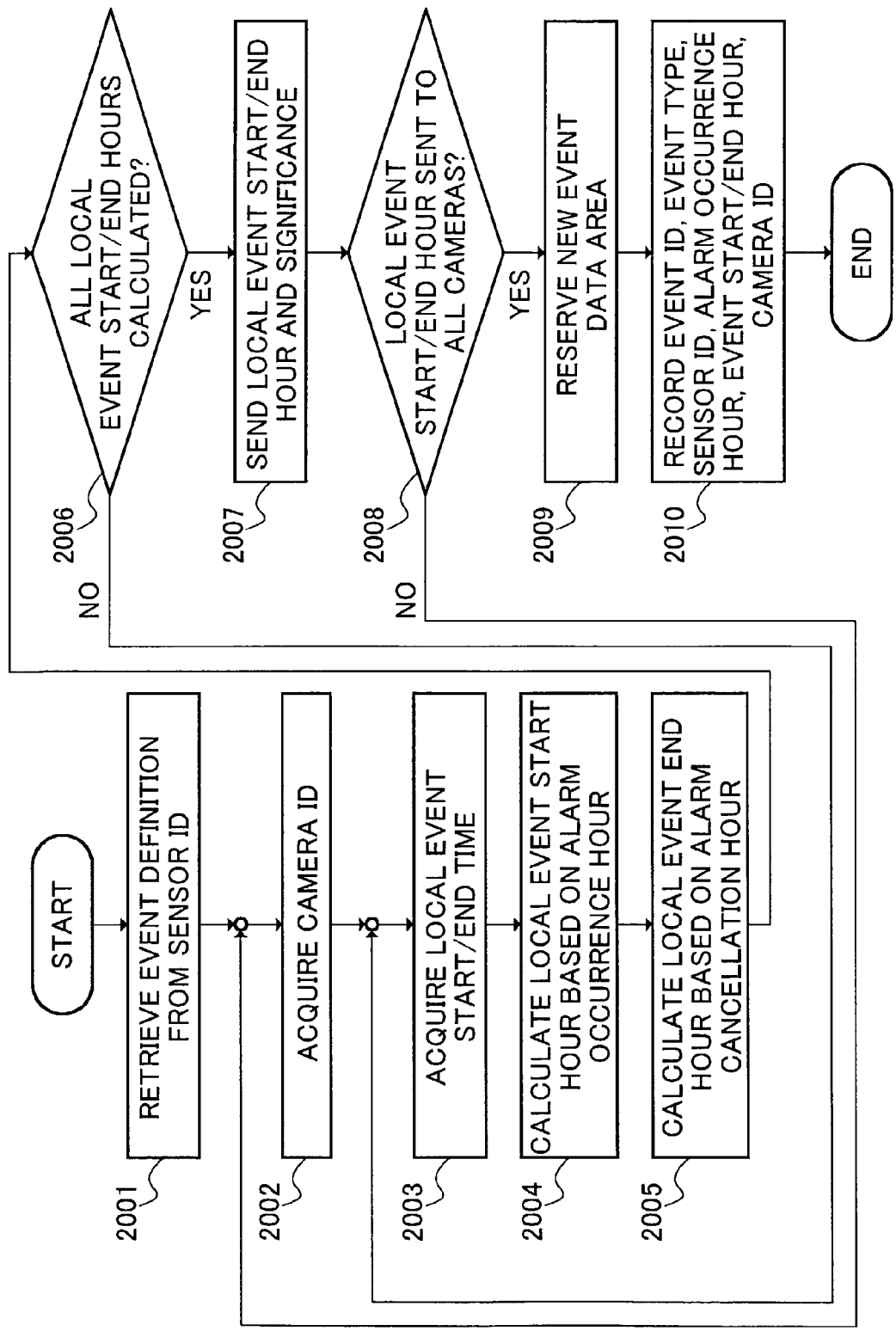
FIG. 20 shows a flow chart of the event management data making process according to Embodiment 4 of the present invention.

Event making section 124 makes event management data following the procedure flow shown in FIG. 20. In FIG. 20, event making section 124 refers to event definition contents such as shown in FIG. 19 and retrieves event definitions from the sensor ID (2001). Event making section 124 then acquires the camera ID from the items of the local event group (2002) and furthermore acquires the first local event start time and end time (2003). Event making section 124 calculates the local event start hour based on the alarm occurrence or cancellation hour and local event start time (2004), and likewise calculates the local event end hour (2005).

2003 through 2005 are repeated until start/end hours are calculated with respect to all local groups included under the local event group (2006).

The camera ID acquired in 2002, the local event start time, end hour, and significances of local events acquired through 2004 and 2005 are sent to control signal communication section 122 (2007).

All local event groups are applied above 2002 through 2007 (2008).

Following this, event making section 124 reserves a storage area for event management data (2009) and makes event management data such as shown in FIG. 21 (2010) to conclude the operation. In FIG. 21, the image from camera TD "3" under event ID "1" contains local events with the local event IDs "1" to "3."

Figure 22:
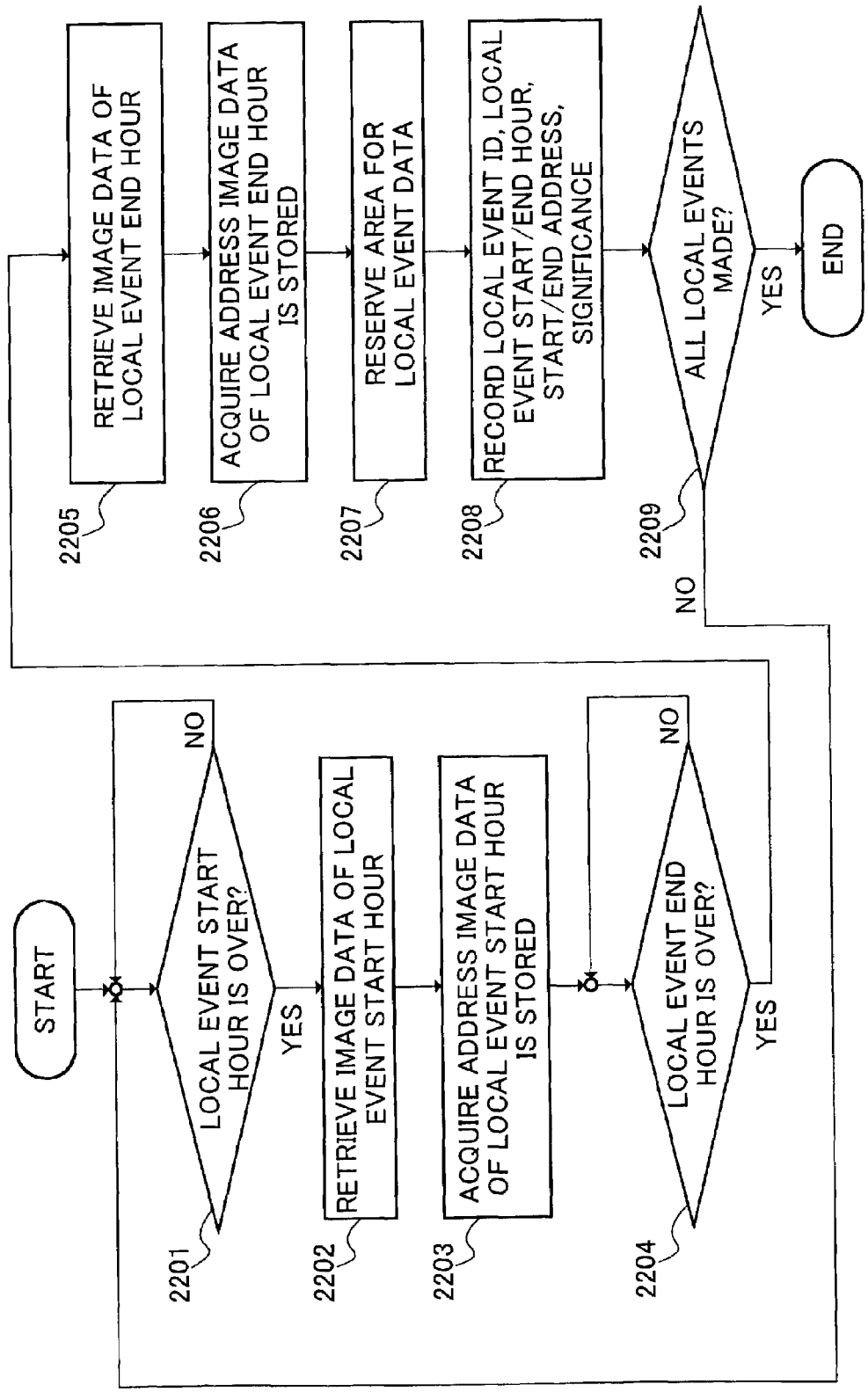
FIG. 22 shows a flow chart of the local event management data making process according to Embodiment 4 of the present invention.

Local event making section 115 receives one or a number of local event making instructions and makes local event management data following the procedure flow shown in FIG. 22.

In FIG. 21, local event making section 115 picks out the first local event making instruction and, if the current hour is not past the local event start hour, waits until the hour (2201).

Thereafter, local event making section 115 retrieves the image data recorded at the local event start hour from temporary recording section 113 (2202) and acquires the address where the data is stored (2203). Similarly, if the current hour is not past the local event end hour, local event making section 115 waits until the hour (2204). Thereafter, local event making section 115 retrieves the image data recorded at the local event end hour from temporary recording section 113 (2205) and acquires the address where the data is stored (2206).

Following this, local event making section 115 reserves a storage area in the local event recording area (2207) and makes local event management data such as shown in FIG. 23 (2209).

All local event groups are applied above 2001 through 2008 (2009) to conclude the operation.

Upon playing an event image, image player apparatus 130 specifies the event ID to be played and the significance of the image to be played. Event management apparatus 120 receives an event play request from image player apparatus 130, and event acquiring section 125 retrieves a relevant event from event recording area 126 and sends local events included in the event and their significances to event selection section 1801. Local event selection section 1801 selects local events of the specified significance and sends their local event IDs to each local recorder apparatus 110. The following operation for acquiring image data in the local recorder apparatus is the same as that of Embodiment 1.

As described above, with the present embodiment, by assigning significance to each local event included in an event according to the meaning its image bears, it is possible to view images of significance with priority and quickly comprehend the situation. Moreover, if recording area capacity runs short while camera images are recorded, by way of recording over images of low significance, newly recorded images of higher significance will not be lost unrecorded.

Moreover, although with the present embodiment significance is determined on the basis of the time period of an image, the present embodiment is not limited thereto, and it is also possible to determine significance on the basis of the type of a sensor, the location a sensor is installed, the hour of alarm occurrence, and the alarm level, and still achieve the same effect.

As described above, according to the present invention, first, it is possible to quickly check not only the suspicious behavior that the surveillance object demonstrates at the time of alarm occurrence but also the suspicious behavior that the surveillance object demonstrates along the transfer path to the surveillance area, without spending much time on the operation for retrieving relevant images from each recorder apparatus, and furthermore it is possible to check the presence or absence of an partner that demonstrates suspicious behavior in an area remote from the surveillance area at the time of alarm occurrence.

Secondly, according to the present invention, it is possible to check the suspicious behavior that the surveillance object demonstrates on his pathway to leave the surveillance area from the alarm cancellation time.

Thirdly, according to the present invention, when alarms generated from one same sensor bear different meanings depending on the time of their occurrence, event images from the most adequate time periods can be acquired, whereby it is possible to comprehend the situation that varies with time.

Fourthly, according to the present invention, among all images included in an event image, images of the highest significance are displayed first, and when later the details need to be learned, images are displayed in the order of significance, whereby the situation can be comprehended quickly and efficiently, and furthermore when recording area capacity runs short, by way of recording over images of low significance, images of high significance will not be lost unrecorded.

The present invention is not limited to the above described embodiments, and various variations and modifications may be possible without departing from the scope of the present invention.

This application is based on Japanese Patent Application No.2001-259281 filed on Aug. 29, 2001, entire content of which is expressly incorporated by reference herein.

What is claimed is:

1. An event management system, comprising:
a local recorder apparatus that continuously records images from a plurality of cameras;
an event definer that defines, for each camera, a period of time relative to an event occurrence time, for an image to be associated with an event;
an alarm receiver that receives an alarm upon occurrence of the event;
an event maker that, when the alarm receiver receives the alarm, calculates, for each camera, a start time and an end time for the image to be associated with the event, based on the period of time defined in the event definer; and a local event maker that extracts, from the images recorded in the local recorder apparatus, the image to be associated with the event, as a local event image, based on the start time and the end time calculated in the event maker, wherein the event definer defines the period of time relative to the event occurrence time for the image to be associated with the event, such that the relative period of time is varied for at least one camera.

2. The event management system according to claim 1, wherein the event definer defines the period of time relative to the event occurrence time for the image to be associated with the event, such that the relative period of time varies for each event type.

3. The event management system according to claim 2, wherein the event definer defines the relative period of time, such that the event type varies in accordance with the event occurrence time.

4. The event system according to claim 1, further comprising an image analysis processor that detects a movement of an object recorded by the cameras and holds information related to the movement as attributive information of the images, wherein the local event maker extracts only images that contain the movement, based on the attribute information.

5. The event management system according to claim 1, wherein:

the local event maker manages the local event image in association with a local event ID that identifies a local event; and the event maker manages a correspondence of the local event ID for the local event image associated with the event occurrence.

6. The event management system according to claim 5, wherein:

the event definer adds a significance to the period of time relative to the event occurrence time for the image to be associated with an event and defines the relative period of time, the event maker assigns the significance to the local event image and manages the local event image.

7. The event management system according to claim 1, wherein the relative period of time for each camara is variably settable with respect to the event occurrence time.

* * * * *